(12) United States Patent
Lang et al.

(10) Patent No.: US 9,005,702 B2
(45) Date of Patent: Apr. 14, 2015

(54) RE-USABLE HIGH-TEMPERATURE RESISTANT SOFTGOODS FOR AEROSPACE APPLICATIONS

(71) Applicant: The Boeing Company, Seal Beach, CA (US)

(72) Inventors: Adam J Lang, Orange, CA (US); Leanne L Lehman, Aliso Viejo, CA (US); Vann Heng, Buena Park, CA (US); Kenneth R Stempel, Culver City, CA (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 13/629,782

(22) Filed: Sep. 28, 2012

(65) Prior Publication Data
US 2014/0248812 A1   Sep. 4, 2014

Related U.S. Application Data

(63) Continuation-in-part of application No. 13/552,128, filed on Jul. 18, 2012, now abandoned.

(51) Int. Cl.
| | | |
|---|---|---|
| C04B 41/80 | (2006.01) | |
| C04B 41/50 | (2006.01) | |
| B32B 5/02 | (2006.01) | |
| B32B 9/04 | (2006.01) | |
| C04B 41/00 | (2006.01) | |
| C04B 41/52 | (2006.01) | |
| C04B 111/00 | (2006.01) | |

(52) U.S. Cl.
CPC ............... C04B 41/5031 (2013.01); B32B 5/02 (2013.01); B32B 9/04 (2013.01); C04B 41/009 (2013.01); C04B 41/5059 (2013.01); C04B 41/5089 (2013.01); C04B 41/52 (2013.01); C04B 2111/00982 (2013.01)

(58) Field of Classification Search
USPC .......................................................... 427/226
See application file for complete search history.

(56) References Cited

U.S. PATENT DOCUMENTS

| | | | | |
|---|---|---|---|---|
| 5,296,288 A | * | 3/1994 | Kourtides et al. | 442/178 |
| 5,439,627 A | * | 8/1995 | De Jager | 264/129 |
| 5,507,933 A | * | 4/1996 | de Nora et al. | 204/247.3 |
| 5,702,761 A | | 12/1997 | DiChiara | |
| 6,225,248 B1 | * | 5/2001 | Leiser et al. | 501/95.2 |
| 6,921,431 B2 | * | 7/2005 | Evans et al. | 106/287.34 |
| 6,955,853 B1 | * | 10/2005 | Tran et al. | 428/325 |
| 2003/0022783 A1 | * | 1/2003 | DiChiara, Jr. | 501/127 |

OTHER PUBLICATIONS

ISR & Writtent Opinion; Rosenberger, Jurgen; PCT/US2013/046188; May 8, 2014.
IPRP on Patentability; Becamel, Philippe; PCT/US2013/046188; Jan. 27, 2015.

* cited by examiner

Primary Examiner — Robert Vetere
(74) Attorney, Agent, or Firm — Nexsen Pruet, LLC

(57) ABSTRACT

High-temperature fabrics with a coatings to provide oxidation protection at high temperatures, and capable of being formed into a variety of softgoods parts, and methods for their manufacture are disclosed.

13 Claims, 6 Drawing Sheets

RE-USABLE HIGH-TEMPERATURE RESISTANT SOFTGOODS FOR AEROSPACE APPLICATIONS

CROSS-REFERENCE

This application is a Continuation-In-Part of U.S. patent application Ser. No. 13/552,128, filed Jul. 18, 2012 (now abandoned) entitled Reusable High-Temperature Resistant Softgoods for Aerospace Applications, and is incorporated by reference herein in its entirety as if made a part of the present specification

TECHNOLOGICAL FIELD

The present disclosure relates to thermally protective compounds, devices incorporating such compounds, and their methods of manufacture. More specifically, the present invention relates to thermally protective fabric-based compositions.

BACKGROUND

Space vehicles, such as, for example, the space shuttles, require protective exterior thermal insulation to facilitate leaving and re-entering the Earth's atmosphere. For example, during re-entry, to be effective, exterior insulation must maintain the vehicle's external structure temperature below about 350° F., while simultaneously experiencing external thermal environments in excess of about 1830° F. In addition, the same external thermal protection must insulate the vehicle, including the external structure, from severe cold found in outer space (e.g. temperature of less than about −100° F.). Still further, external thermal protective elements must withstand the mechanical stress associated with launch vibrations, acoustics, landing impacts and exposure to radiation.

Previously, lightweight ceramic state-of the art thermal insulation tiles were limited in their use to temperatures of about 2375° F. in an oxidizing environment. If temperatures will exceed 2375° F., a dense ceramic material must be used. However, denser materials add significant, undesirable weight. U.S. Pat. No. 6,225,248 (the '248 patent) discloses a lightweight, high temperature ceramic insulation comprising carbon, silicon and oxygen that is capable of retaining its shape and strength when exposed to temperatures of about 3100° F. The '248 patent further discloses that the improved insulation is made by combining substrates with a reaction product derived from the reaction of di- and tri-functional silanes to form a gel, followed by heating or pyrolyzing the gel and the carbon substrate in an inert environment to form the high temperature, lightweight ceramic insulation.

BRIEF SUMMARY

High-temperature fabrics with coatings to provide oxidation protection at high temperatures capable of being formed into a variety of softgoods parts and methods for their manufacture are disclosed. Preferably, these parts may be employed on the exterior or interior of an aerospace vehicle, preferably as softgood parts, for example, to protect sensitive regions from high temperature gases or plasma. Softgood parts are understood to be parts such as, for example, gap fillers, seals, etc. for objects, such as, for example, spacecraft that are subjected to extreme temperatures upon re-entry into, for example, the Earth's atmosphere.

The softgood parts created according to this disclosure, are stable at temperatures up to, at least about 2800° F., and exhibit only graceful failure characteristics (limiting or potentially limiting useful life of the softgood to a single use) to at temperatures up to about 3100° F., and include use as gap fillers that are preferably reusable.

According to one preferred procedure disclosed herein, the high-temperature fabrics disclosed herein are the result of processing carbon fabric with a mixture of liquid silane chemicals. This creates a gel in intimate contact with the carbon fabric. The gel is then dried in-situ with the fabric. The fabric is pyrolyzed in a non-oxygen atmosphere to allow the silica in the dried gel to convert the carbon in the fabric into a silicon-oxy-carbide material. This, process is then repeated depending on the application. According to one alternative, the final step is the use of a low-alkali colloidal silica solution to coat the silicon-oxy-carbide fabric as an oxidation protection.

In one alternative, the present disclosure is directed to a method for making a thermal insulating material comprising the steps of providing a non-oxide-containing base fabric having first and second sides and providing a coating to the base fabric. The base fabric preferably comprises silicon carbide. The first and second sides of the base fabric are coated followed by drying the coated base fabric.

In another variation, the base fabric comprises an oxide-containing material comprising alumina, and the coating preferably comprises a zirconia refractory-containing material, de-ionized water and a compatible emittance agent.

In yet another alternative, the base fabric comprises an oxide-containing material comprising alumina, and the coating preferably comprises colloidal alumina, alumina powder, and a compatible emittance agent.

In still another alternative, the base fabric is a non-oxide-containing material comprising silicon carbide, and the coating preferably comprises colloidal silica.

In yet another variation, the base fabric comprises a non-oxide-containing material comprising silicon carbide, and the coating preferably comprises an unpyrolyzed silicon carbide pre-ceramic polymer resin and silicon carbide powder.

According to still another variation, the present disclosure is directed to a method for making a thermal insulating material comprising the steps of providing a non-oxide-containing base fabric comprising a carbon-containing material having first and second sides and providing a silicon-containing gel coating to the base fabric, such that coating infiltrates the base fabric. The fabric is then dried and pyrolyzed in an inert environment to convert the carbon-containing material into a silicon-oxy-carbon material. According to another variation, the pyrolyzed base fabric is coated with a low alkali-based coating selected from the group consisting of: colloidal alumina, colloidal silica, zirconia, and combinations thereof. De-ionized Ludox is one particularly preferred colloidal silica.

The silane-containing gel coating composition of the present disclosure, for use with the variation set forth immediately above, preferably comprises di- and trifunctional alkoxide reactants having the general formula:

$(R'O)_3$—Si—R and $(R''O)_2$—Si—R'''R°, wherein R, R', R", R''' and R° are the same or different and represent hydrocarbon radicals of 1-12 carbons; provided that either R''' or R° is a hydrogen atom, R' and R" are alkyl radicals, and R, R''' or R° is an alkyl, aryl, or substituted aryl radicals of 1-12 carbons. Preferably the hydrocarbon radicals are radicals comprising carbon and hydrogen that are selected from the group consisting of: straight chain radicals; branched chain radicals; saturated radicals; unsaturated radicals; and combinations thereof, and the hydrocarbon radicals comprise groups having from 1-12 carbon atoms, and wherein at least one of the hydrocarbon groups contain at least two carbon atoms, and either R''' or R° is hydrogen.

In another variation, the silane-containing composition is selected from the group consisting of: alkyl-trioxy silanes; alkyldialkoxy silanes; and combinations thereof, provided that either R''' or R° group in the dialkoxy silane is hydrogen. More preferably, the silane-containing composition is selected from the group consisting of: methyltrimethoxysilane $CH_3Si(OCH_3)_3$, ethylythimethoxysilane $CH_2H_5Si(OCH_3)_3$, methyltriethoxysilane $CH_3Si(OC_2H_5)_3$, methyldiethoxysilane $(CH_3)Si(OC_2H_5)_2$, methyldimethoxysilane $(CH_3)Si(OCH_3)_2$, ethyldiethoxysilane $(C_2H_5)Si(OC_2H_5)_2$, ethyldibutoxysilane $(C_2H_5)Si(OC_4H_9)_2$, vinyldiethoxysilane $(CH_2:CH)Si(OC_2H_5)_2$, phenyldimethoxysilane $(C_6H_5)Si(OCH_3)_2$, and combinations thereof in any ratios, provided that either R''' or R° group in the dialkoxy silane is hydrogen.

Still further the present disclosure is directed to a thermal insulating fabric comprising a high-temperature fabric treated with a siloxane gel, said siloxane gel comprising the formula $Si_aC_bO_c$, wherein a=1, b=0.2 to 1.5, and c=1 to 3. Preferably, the high-temperature resistant fabric is a non-oxide-containing material, such as a carbon-containing material.

In one preferred variation, the high-temperature-containing fabric comprises alumina and the coating comprises a zirconia refractory material, de-ionized water and a compatible emittance agent.

In another variation, the high-temperature-containing fabric comprises alumina and the coating comprises colloidal alumina, alumina powder and a compatible emittance agent.

In yet another alternative, the high-temperature-containing fabric comprises silicon carbide and the coating comprises colloidal silica. Still further, the present disclosure contemplates a variation where the non-oxide-containing fabric comprises silicon carbide and the coating comprises an unpyrolyzed silicon carbide pre-ceramic polymer resin and silicon carbide powder.

In one preferred variation, the present disclosure further contemplates an insulating fabric coated with a material comprising a siloxane gel, wherein the siloxane gel is made from a silane-containing composition comprising di- and trifunctional alkoxide reactants having the general formula:

(R'O)$_3$—Si—R and (R'''O)$_2$—Si—R'''R°, wherein R, R', R'', R''' and R° are the same or different and represent hydrocarbon radicals of 1-12 carbons; provided that either R''' or R° is a hydrogen atom, R' and R'' are alkyl radicals, and R, R''' or R° is an alkyl, aryl, or substituted aryl radicals of 1-12 carbons. The hydrocarbon radicals preferably are radicals comprising carbon and hydrogen and that are selected from the group consisting of: straight chain radicals; branched chain radicals; saturated radicals; unsaturated radicals; and combinations thereof, and comprise groups having from 1-12 carbon atoms, and wherein at least one of the hydrocarbon groups contain at least two carbon atoms, and either R''' or R° is hydrogen.

Still further, the present disclosure contemplates that the silane-containing composition is selected from the group consisting of: alkyl-trioxy silanes; alkyldialkoxy silanes; and combinations thereof, provided that either R''' or R° group in the dialkoxy silane is hydrogen, and the silane-containing composition is selected from the group consisting of: methyltrimethoxysilane $CH_3Si(OCH_3)_3$, ethylythimethoxysilane $CH_2H_5Si(OCH_3)_3$, methyltriethoxysilane $CH_3Si(OC_2H_5)_3$, methyldiethoxysilane $(CH_3)Si(OC_2H_5)_2$, methyldimethoxysilane $(CH_3)Si(OCH_3)_2$, ethyldiethoxysilane $(C_2H_5)Si(OC_2H_5)_2$, ethyldibutoxysilane $(C_2H_5)Si(OC_4H_9)_2$, vinyldiethoxysilane $(CH_2:CH)Si(OC_2H_5)_2$, phenyldimethoxysilane $(C_6H_5)Si(OCH_3)_2$, and combinations thereof in any ratios, provided that either R''' or R° group in the dialkoxy silane is hydrogen.

According to yet another alternative, the present disclosure is directed to an insulating fabric, wherein the siloxane gel comprises:

a) at least one dialkoxy silane having the formula (R''O)$_2$—Si—R'''R°, wherein R'' is an alkyl radical having 1-12 carbons and either R''' or R° is a hydrocarbon radical having 1 to 12 carbons and either R''' or R° is hydrogen; and b) at least one trialkoxy silane having the formula (R'O)$_3$—Si—R, wherein R' is an alkyl radical of 1 to 12 carbons and R is the same or different from R' and is a hydrocarbon radical of 1 to 12 carbons, where the ratio of (a) to (b) by weight is from 1:1 to 1:20, and, more preferably, where R' and R'' of the dialkoxy silane (a) and the trialkoxy silanes (b) are alkyl radicals having 1-8 carbon atoms, and the R''' of the dialkoxy silane is a hydrocarbon radical having 1 to 12 carbon atoms and R° is hydrogen or other hydrocarbon radicals.

The insulating fabrics of the present disclosure are highly temperature-resistant up to a temperature of at least about 2800° F., and exhibit graceful failure characteristics at temperatures up to about 3100° F. and find particular utility as interior or exterior softgoods, such as, for example, gap fillers, seals, etc. for objects, such as, for example, spacecraft that are subjected to extreme temperatures upon re-entry into, for example, the Earth's atmosphere.

BRIEF DESCRIPTION OF THE DRAWINGS

Figure 1:
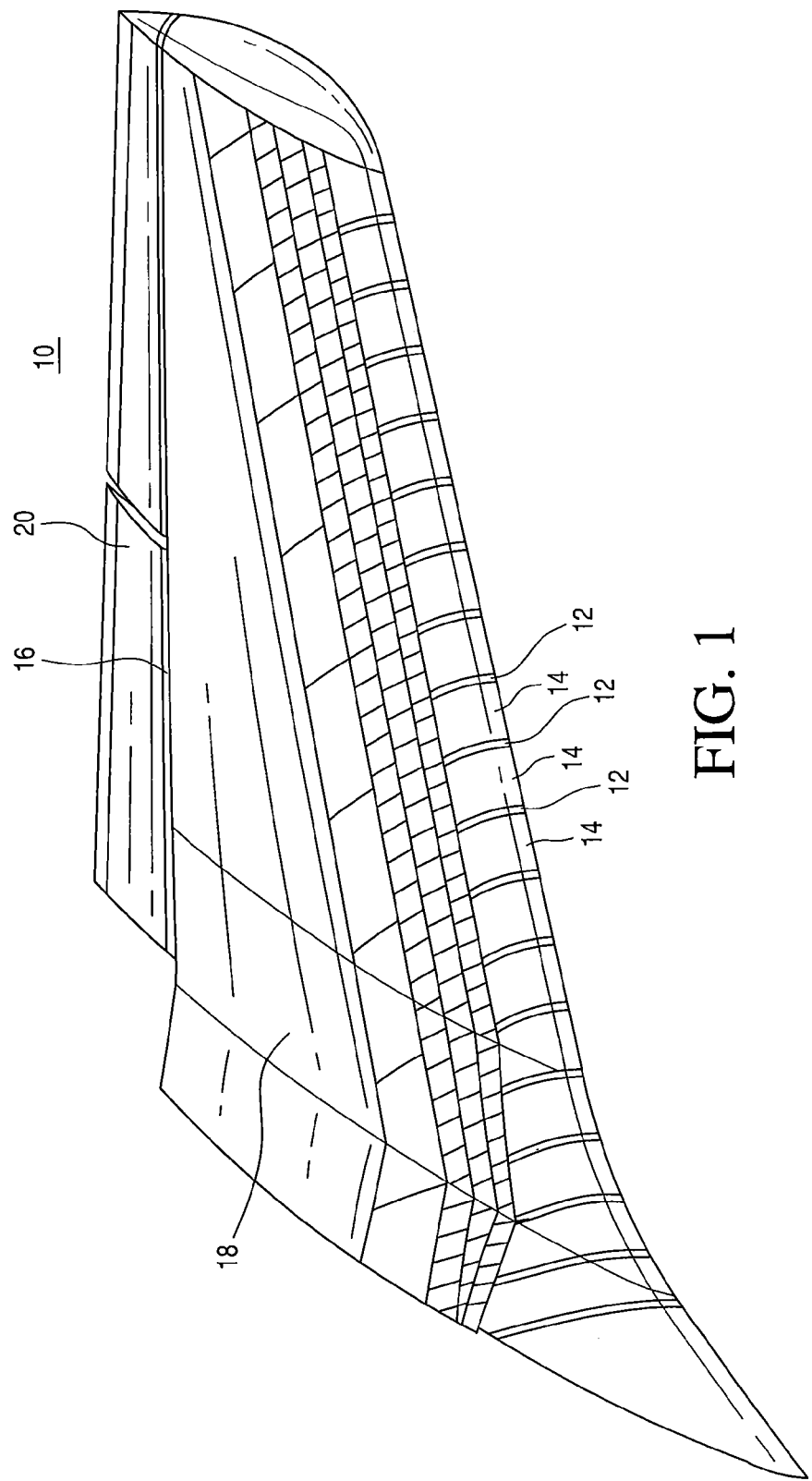
Figure 2:
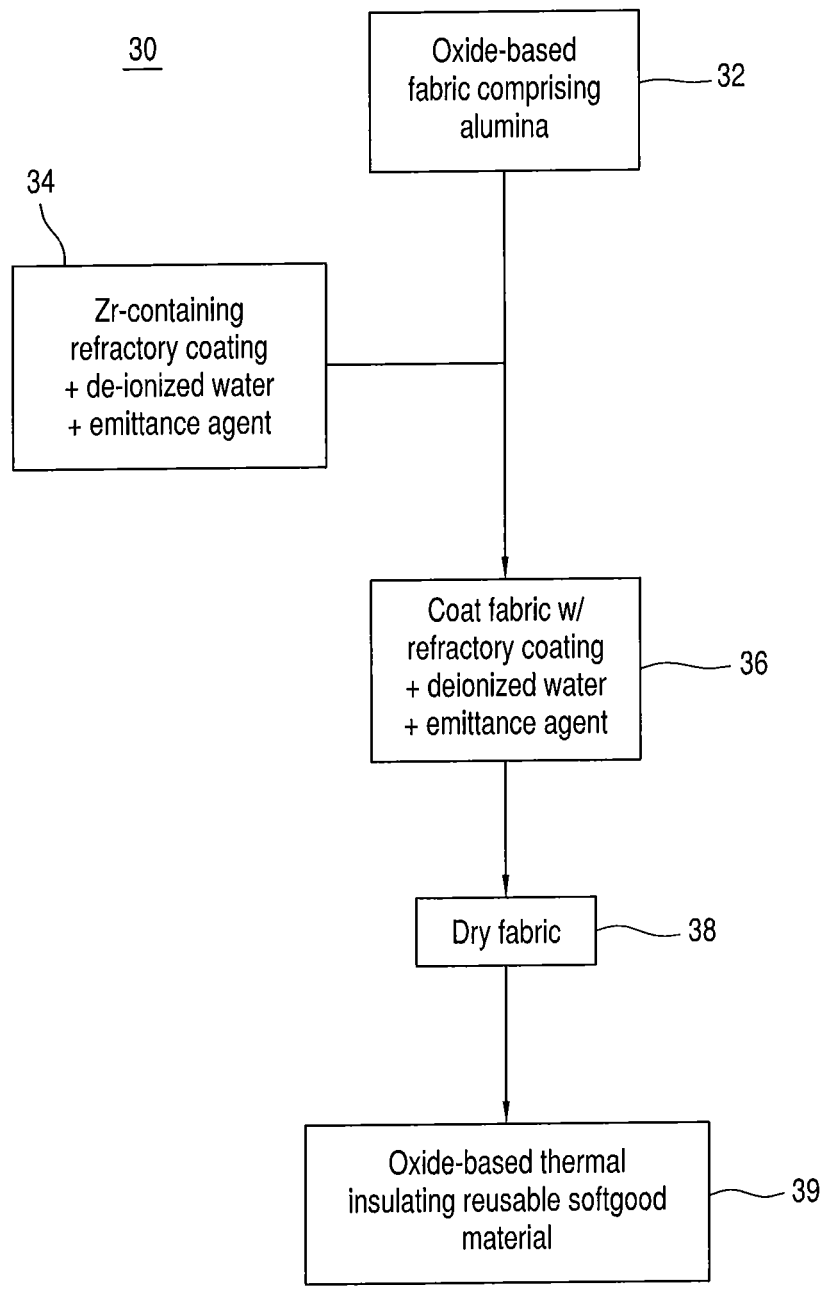
Figure 3:
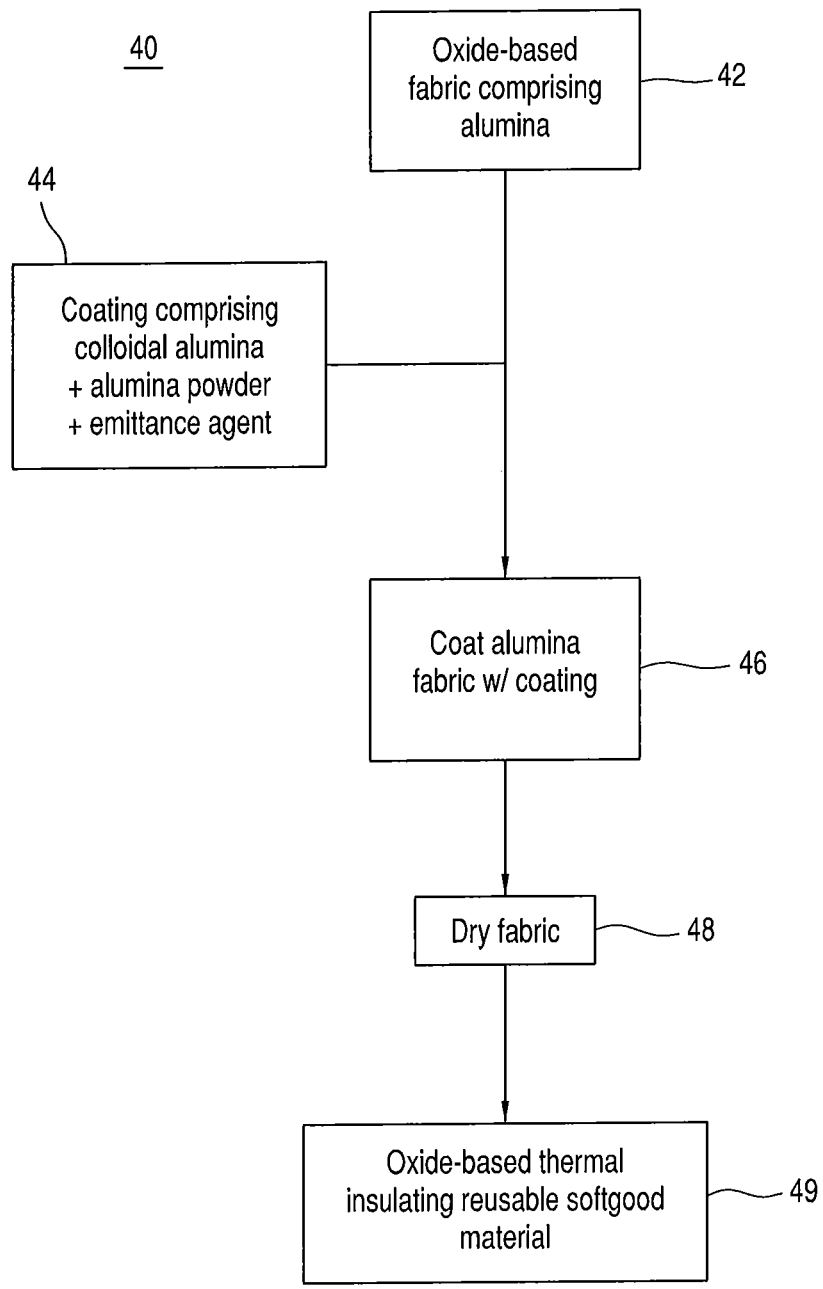
Figure 4:
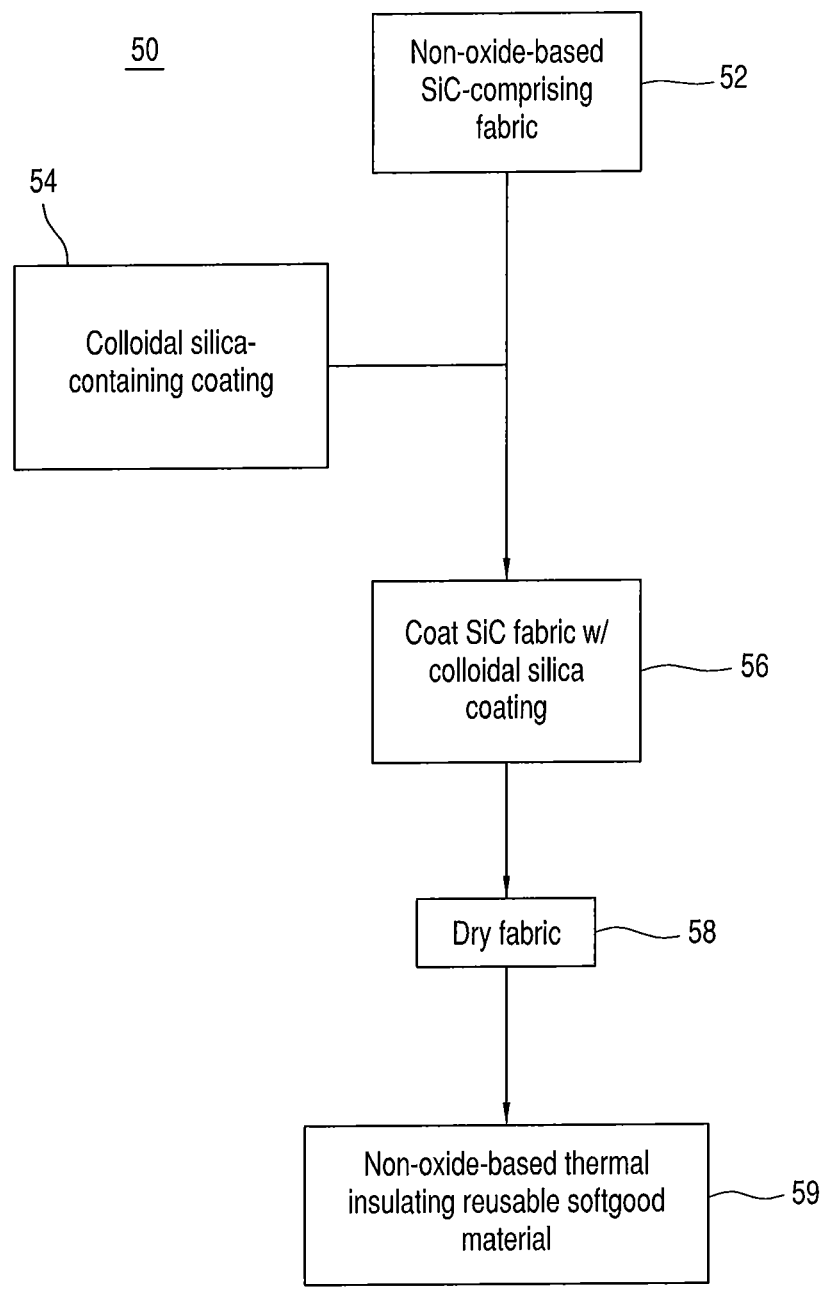
Figure 5:
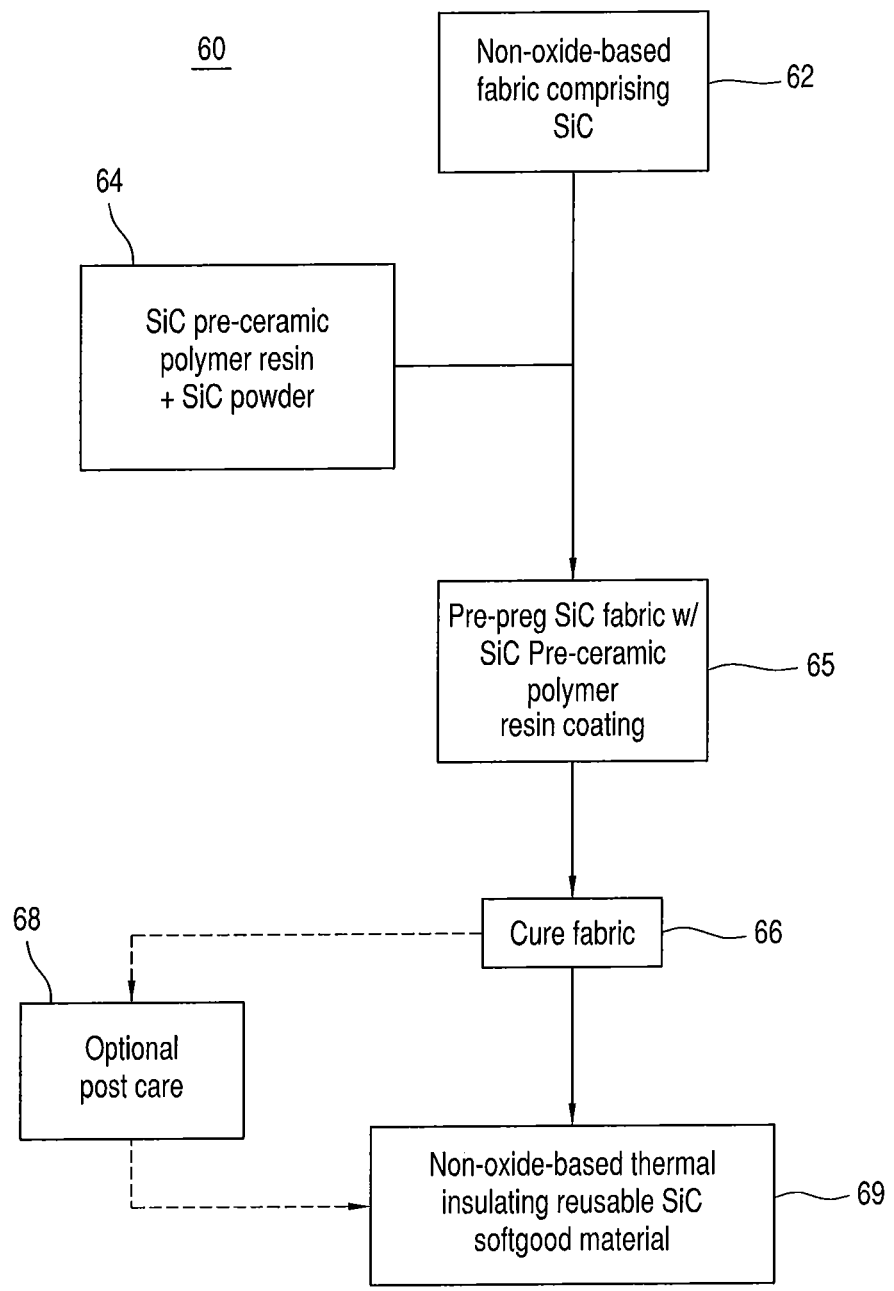
Figure 6:
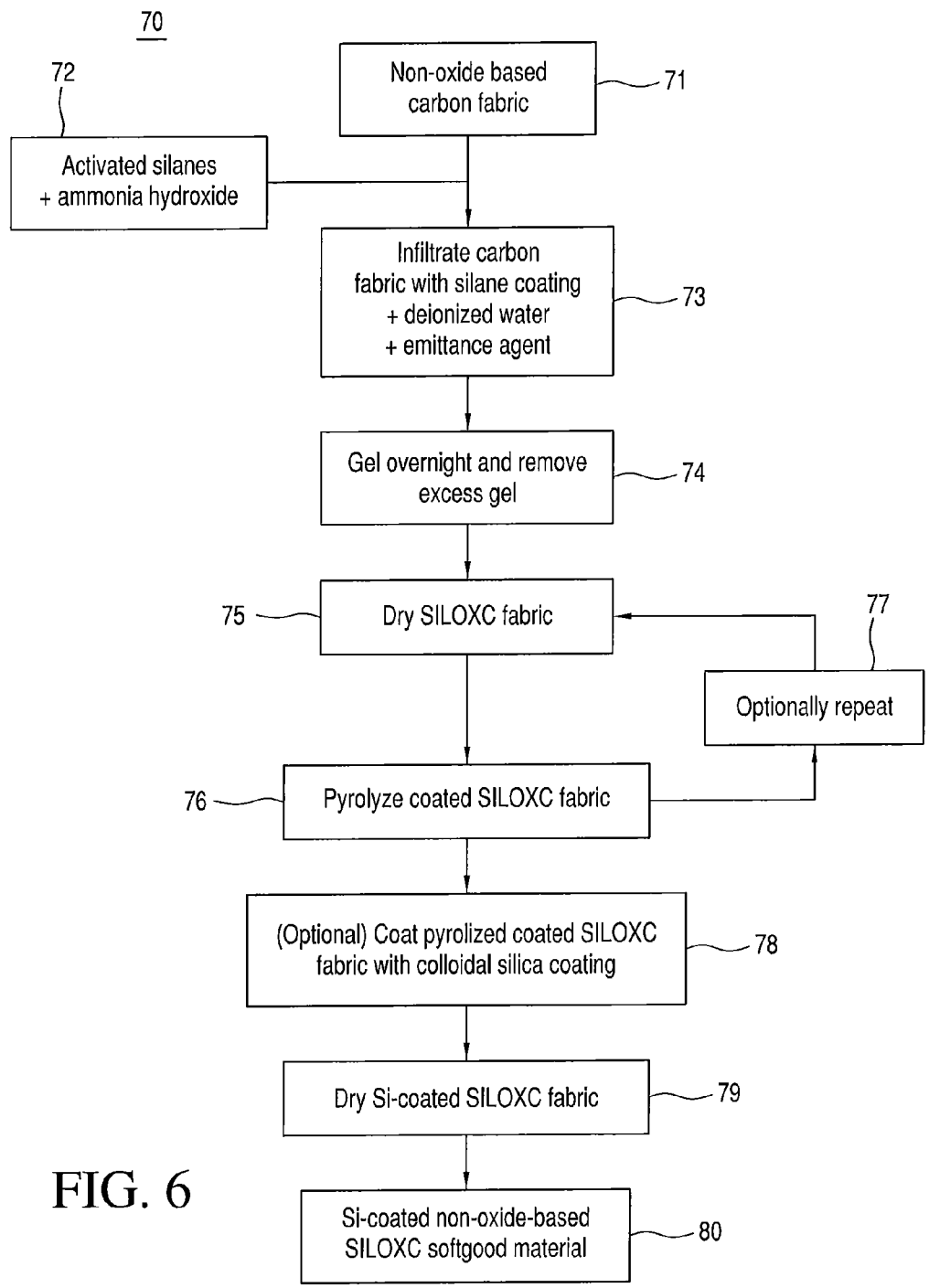

Having thus described variations of the disclosure in general terms, reference will now be made to the accompanying drawings, which are not necessarily drawn to scale, and wherein:

FIG. 1 is a close-up view of a softgood prepared according to the disclosure used as a gap filler between tiles and as a seal on a hypersonic aircraft;

FIG. 2 is a flow diagram of one alternative of the present disclosure showing an oxide-based alumina fabric coated with zirconia-containing refractory coating, deionized water and an emittance agent, and processed to achieve a thermal insulating oxide-based reuseable softgood material;

FIG. 3 is a flow diagram of an alternative of the present disclosure showing an oxide-based alumina fabric coated with a colloidal alumina-containing coating, alumina powder and an emittance agent, and processed to achieve a thermal insulating oxide-based reuseable softgood material;

FIG. 4 is a flow diagram of an alternative of the present disclosure showing a non-oxide-based silicon carbide (SiC) fabric coated with a colloidal silica-containing coating, and processed to achieve a thermal insulating non-oxide-based reuseable softgood material;

FIG. 5 is a flow diagram of an alternative of the present disclosure showing a non-oxide-based SiC fabric coated with a coating comprising a SiC pre-ceramic resin and a SiC powder, and processed to achieve a thermal insulating non-xide-based reuseable softgood material;

FIG. 6 is a flow diagram of an alternative of the present disclosure showing a non-oxide-based carbon fabric coated with a mixture of silanes and ammonium hydroxide and processed to achieve a thermal insulating non-oxide-based silicon-oxy-carbide (SILOXC) reuseable softgood material;

DETAILED DESCRIPTION

The present invention will be described more fully hereinafter with reference to the accompanying drawings, where preferred alternatives are shown. The disclosures may, however, be embodied in many different forms and should not be construed as limited to the examples set forth. Rather, these examples are provided so that this disclosure will convey the scope of the inventions to those skilled in the field. Like numbers refer to like elements throughout.

Current state-of-the-art thermal protection system tiles, such as, for example, those described above have been shown to handling surface temperatures that exceed the capability of the presently available compositions that act as gap-fillers between rigid tile parts. As a result, the thermal protection systems presently in use must be refurbished after each mission once the thermal protection systems have been exposed to high temperature environments associated with conditions, such as, for example, re-entry into the Earth's atmosphere. While improvements in external heat-resistant tiles allow for their re-use, the materials used to fill spaces between such tiles (so-called "gap-fillers") are not equally robust and must be inspected and replaced after a single use due to extreme exposure to high-temperature environments.

The high-temperature fabric gap-fillers described herein are capable of withstanding significantly higher temperatures than previous, known gap-fillers. In some instances, this allows the gap-fillers to be used repeatedly without replacement, and allows for an increase of the temperatures to which the external temperature protection surface can be exposed without causing damage to neighboring parts or underlying structures. The existing gap-fillers are based on oxide fabrics (such as, for example, Nextel 312 and Nextel 440) and non-oxide fabrics. Such materials, however, lose strength and begin to break down at high temperatures. The known gap-fillers often employ coatings that contribute to the degradation of the fabric at high temperature or are optimized for a single use. Further, the existing gap-fillers employ emittance agents mixed into the coating allowing the re-radiation of energy into space. However, if the coating is damaged during flight, the gap-filler may cause localized over-heating due to the exposed fabric. The proposed high-temperature fabric softgoods with oxidation protective coating degrade significantly less than the current solutions to a degree that allows for their reuse. As a result, the materials disclosed herein and are capable of being used multiple times under nominal conditions, while providing superior protection during flight conditions. Further, in the event that damage is sustained by the gap filler, the high-temperature resistant fabric is either inherently emissive (coated non-oxide fabrics), or, in the case of oxide fabrics, is treated with an emittance agent, thereby reducing the risk of localized overheating.

FIG. 1 is a representative drawing of a wing section of an aircraft, such as, for example a hypersonic aircraft fixture 10. Softgoods made in accordance with the present disclosure are employed as gap fillers 12 located between tile sections 14. In further accordance with the present disclosure, the improved softgoods described herein are shown used as seals 16 located between structural elements 18, 20 of the hypersonic aircraft fixture 10. It is understood that the structural elements may be moving or stationary structures.

As outlined in FIG. 2, according to a first variation, the present disclosure relates to a method 30 for making an oxide-based fabric comprising the steps of providing a high temperature oxide alumina fabric material 32 such as, for example, Nextel 720™ (3M, Minneapolis, Minn.). The fabric material 32 is provided on a smooth surface. Coating components 34 comprise, for example, a zirconia-containing refractory coating material such as, for example, Aremco 634-ZO™ (Aremco Products Inc. Valley Cottage, N.Y.) is mixed with an emittance agent, such as, for example Ferro 10335 Black (Ferro Corporation, Washington, Pa.), and de-ionized water according to the following preferred ratio: 634-ZO—4 parts; DI Water—1 part; 10335 Black—8 wt % of the 634-ZO+DI Water mix. The components were added to a 1 liter container approximately ⅓ full with 0.25" milling media, and rolled for 1 hour to mix. The mixture was then poured through a strainer. A first side of the fabric is coated 36 by any acceptable application means including, for example, brushing resulting in a weight gain of about 0.165 g/in². The fabric is then allowed to dry for about 4 hours and inverted to expose the uncoated second side of the fabric, which is then also coated resulting in a weight gain of about 0.129 g/in². The fabric is then allowed to dry 38 for 16 hours at room temperature. Testing of the finished material 39 material was carried out by installing samples between representative strips of coated insulating tile and then exposed up to temperatures as high as about 3000° F. at approximately 3 Torr of air. While a first side of the fabric was coated and dried, followed by coating and drying the second side, the present disclosure also contemplates methods by which the two sides of the fabric may be coated substantially simultaneously followed by a single drying step, as shown in FIG. 2.

FIG. 3 is a flowchart outlining an alternative of the present disclosure; a method 40 for making an oxide-based fabric comprising the steps of providing a high temperature oxide alumina fabric material 42 such as, for example, Nextel 720™ (3M, Minneapolis, Minn.). The fabric material is provided on a smooth surface. The coating 44 comprises a colloidal alumina solution such as, for example, preferably comprising Alumina Coat (ZIRCAR Refrectory Composites, Florida, N.Y.) (77%) mixed with alumina powder such as, for example, AKP-50™ Alumina (Sumitomo Chemical, Japan) (15%) and an emittance agent such as, for example, Ferro 13335 Black (Ferro Corporation, Washington, Pa.) (8%). The components were added to a 1 liter container approximately ⅓ full with 0.25" milling media, and rolled for 1 hour to mix. The mixture was then poured through a strainer. A first side of the fabric is coated 46 by any acceptable application means including, for example, brushing, resulting in a weight gain of about 0.091 g/in². The fabric is then allowed to dry 48 for about 4 hours and inverted to expose the uncoated second side of the fabric, which is then also coated resulting in a weight gain of about 0.063 g/in². The fabric is then allowed to dry for 16 hours at room temperature. Testing of the finished material 49 was carried out by installing samples between representative strips of coated insulating tile and then exposed up to temperatures as high as about 3000° F. at approximately 3 Torr of air. While a first side of the fabric was coated and dried, followed by coating and drying the second side, the present disclosure also contemplates methods by which the two sides of the fabric may be coated substantially simultaneously followed by a single drying step, as shown in FIG. 3.

FIG. 4 is a flowchart outlining yet another variation in the present disclosure relating to a method 50 for making a non-oxide-based fabric comprising the steps of providing a high temperature silicon carbide fabric material 52 such as, Tyranno® SA silicon carbide fiber coated with a coating 54 comprising a colloidal silica coating such as, for example, de-ionized Ludox® (AS-30). The fabric material 52 is provided on a smooth surface. The colloidal silica coating 54 is brushed onto a first side of the fabric to coat the fabric 56 by any acceptable application means including, for example, brushing, resulting in a weight gain of about 0.245 g/in². The fabric is then allowed to dry 58 for about 4 hours and inverted to expose the uncoated second side of the fabric, which is then also coated, resulting in a weight gain of about 0.122 g/in². The fabric is then allowed to dry for 4 hours at 200° F. Testing of the finished material 59 was carried out by installing samples between representative strips of coated insulating tile and then exposed up to temperatures as high as about 3000° F. at approximately 3 Torr of air. While a first side of the fabric was coated and dried, followed by coating and drying the second side, the present disclosure also contemplates methods by which the two sides of the fabric may be coated substantially simultaneously followed by a single drying step, as shown in FIG. 4.

In still another alternative, FIG. 5 is a flowchart outlining a method 60 for making a non-oxide-based fabric with an unpyrolized silicon carbide pre-ceramic polymer coating. A high temperature silicon carbide fabric material 62 such as, for example, Tyranno® SA silicon carbide (SiC) fiber is provided. A coating 64 is made by mixing 3 part by weight of silicon carbide pre-ceramic polymer resin (PCP), preferably KDT Ceraset Polysilazane 20 (Kion Defense Technologies, Huntingdon Valley, Pa.), with 1 part by weight silicon carbide (SiC) powder (Alfa Aesar, Ward Hill, Mass.). A layer of SiC fabric is coated 65 with the PCP-SiC resin/SiC powder mixture and placed between Mylar® sheets. The PCP-SiC/SiC mix coating accounts for a weight gain on the fabric of about 0.348 g/in². The impregnated fabric between the Mylar® sheets is placed between aluminum caul plates and cured 66 under vacuum at about 350° F. More specifically, the cure cycle comprises increasing temperature 15° F./min up to 180° F. and maintaining temperature at 180° F. for 60 mins at 18-20 in. Hg of vacuum. A pressure of 20 psi is then applied followed by releasing the vacuum and then increasing the pressure to about 100 psi at 180° F. for 60 mins. The temperature is then increased 10° F./min to 250° F. and held for 60 mins at a pressure of 100 psi. Finally, the pressure is then increased at a rate of 10 F/min to 350 F and held for 60 mins at a pressure of 100 psi. The pressure is then reduced and the product cooled, and removed from the press when pressure is returned to ambient pressure. Optionally, the product may be postcured 68 to reduce ammonia odor. Testing of the finished material 69 was carried out by installing samples between representative strips of coated insulating tile and then exposed up to temperatures as high as about 3000° F. at approximately 3 Torr of air.

Another alternative method 70 is shown by the flowchart in FIG. 6, relating to reusable high temperature non-oxide silicon-oxy-carbide (SILOXC) fabric. A carbon fabric 71 is infiltrated 73 by an activated mixture of silanes, such as, for example preferably, Methyldiethoxysilane SIM6505.0-Y01 (Gelest, Morrisville, Pa.), preferably Trimethoxymethylysilane 246174 (Sigma Aldrich, St. Louis, Mo.), and ammonium hydroxide 72. The infiltrated fabric is allowed to gel overnight at about 88° F., and then the excess gel manually removed from the fabric 74. The impregnated fabric is then dried for 8 hours at about 200° F. under 30 inches Hg of vacuum 75. The fabric is then pyrolyzed 76 in a flowing argon atmosphere for 30 minutes at 2012° F. The infiltration, gelling, drying and pyrolyzing process is then repeated 77 at least once. The resulting silicon-oxy-carbide fabric is optionally coated with a colloidal silica coating 78 such as, for example, de-ionized Ludox® (AS-30). The colloidal silica solution is applied to one side of the fabric, allowed to dry for 4 hours, and then applied to the opposite side of the fabric and allowed to dry for 16 hours 79. The fabric is then allowed to dry for about 16 hours at room temperature. Testing of the finished material 80 was carried out by installing samples between representative strips of coated insulating tile and then exposed up to temperatures as high as about 3000° F. at approximately 3 Torr of air. While a first side of the fabric was coated and dried, followed by coating and drying the second side, the present disclosure also contemplates methods by which the two sides of the fabric may be coated substantially simultaneously followed by a single drying step, as shown in FIG. 6.

In the variation presented immediately above, the carbon fabric is converted into a silicon-oxy-carbide (SILOXC) fabric. When present, the de-ionized Ludox® provides a low alkali coating compatible with the fabric that helps to protect against oxidation. In addition, the silicon carbide fabric and Ludox-containing SILOXC gap filling materials of this disclosure have inherent emissivity such that, in the of damage to the gap filler, there will be no loss in emissivity as is otherwise likely for oxide fabrics utilizing a coating-based emissivity agent.

The finished SILOXC materials of the present disclosure maintain a degree of pliability as compared to presently known gap filling materials. As a result, the finished SILOXC materials of the present disclosure resist becoming weak and brittle, even after exposure to high re-entry temperatures in excess of about 2800° F.

The present disclosures relate to substrates, including treated fabric substrates, especially treated fabric substrates used as gap fillers, that are oxidation resistant, lightweight, amorphous ceramic insulations, some of which comprise carbon, silicon and oxygen (SILOXC compounds), and to methods for preparing the same. The methods for making the compositions that impregnate the substrate fabrics comprise coating or impregnating a substantially pliable porous substrate such as, for example, carbon with a siloxane gel derived from the reaction product of di- and trialkyloxy silanes such as, for example, di- and trifunctional silanes to form sol-gel, in situ, with the carbon substrate, followed by drying the substrate and subsequently heating or pyrolyzing the coated carbon substrate, preferably in an inert environment, to form a ceramic carbon insulation fabric that retains a predetermined degree of pliability.

In one alternative, a carbon-containing substrate comprises a fabric having a particular configuration that may be used for making lightweight, porous, ceramics suitable for use a thermal insulators that, in turn, may be used in conjunction with thermal insulating tiles for space or other vehicles or objects that confront temperatures up to or in excess of 2800° F., such as, for example, the temperatures confronted by space shuttles or the like. In this alternative, the porous carbon fabric is coated by infiltrating or impregnating the preform with an effective amount of sol-gel (siloxane gel), wherein the gel is dried onto the carbon fabric to form a ceramic precursor. The precursor is then further cured or pyrolyzed, preferably in an inert atmosphere, whereby the dried gel and the carbon reacts to form the pliable ceramic insulation, having the same configuration, if desired. The finished insulation may then be cut to size as desired and implemented in conjunction with other thermal insulators that may be non-pliable, and that require positioning proximate to pliable thermal insulation. Repeated processing can be used to achieve the desired weight, strength and high-temperature oxidation stability required of the finished pliable ceramic fabric.

Preferred di- and trifunctional alkoxide reactants include the alkoxides of silicon having two and three Si—O bonds, respectively. Particularly preferred silanes comprise a combination of silanes with tri- and dioxygen functionality having the general formula $(R'O)_3$—Si—R and $(R'''O)_2$—Si—$R'''R^\circ$ wherein R, R', R", R''' and $R^\circ$ are the same or different and represent hydrocarbon radicals of 1-12 carbons; provided that either R''' or $R^\circ$ is a hydrogen atom, R' and R" are alkyl radicals, and R, R''' or $R^\circ$ is an alkyl, aryl, or substituted aryl radicals of 1-12 carbons. The term hydrocarbon, or organo groups are radicals comprising carbon and hydrogen (—CH) which may be straight or branched chain, saturated or unsaturated hydrocarbons.

The number of carbon atoms in the hydrocarbon or organo groups range from 1-12 and preferably from 1-8, more preferably 1-4, e.g. 1-2 carbons, wherein at least one of the hydrocarbon groups contain at least two carbon atoms, e.g. ethyl group and either $R'''$ or $R^o$ is hydrogen. The R, R', R", R'" and $R^o$ groups of the above formulae are preferably lower alkyl groups, e.g. 1-8 carbons such as, for example, methyl, ethyl, propyl, isopropyl, butyl, isobutyl, pentyl, hexyl, heptyl, etc. their isomers, or mixtures thereof, and include the alkenyl or vinyl unsaturated groups such as, for example, vinyl, divinyl, propenes, butenes, etc., and various mixtures thereof. It is understood, however, that either $R'''$ or $R^o$ is a hydrogen atom and the alkoxy groups, such as the R' and R" of the silanes are alkyl radicals of 1-12 carbons and preferably $C_1$ to $C_4$ carbons. The R, R'" and $R^o$ groups in the above formulae include all of the above groups of 1-12 carbons, and also other hydrocarbon groups including the aryl, aralky and aralkyl radicals such as phenyl and the lower alkyl substituted aryl groups and mixtures thereof.

Specific examples of some preferred silanes useful for preparing the siloxanes of this disclosure include the alkyltrioxy silanes such as the methyltrimethoxysilane $CH_3Si(OCH_3)_3$, ethylythimethoxysilane $CH_2H_5Si(OCH_3)_3$, methyltriethoxysilane $CH_3Si(OC_2H_5)_3$ and the alkyldialkoxy silanes such as, for example, methyldiethoxysilane $(CH_3)Si(OC_2H_5)_2$, methyldimethoxysilane $(CH_3)Si(OCH_3)_2$, ethyldiethoxysilane $(C_2H_5)Si(OC_2H_5)_2$, ethyldibutoxysilane $(C_2H_5)Si(OC_4H_9)_2$, vinyldiethoxysilane $(CH_2{:}CH)Si(OC_2H_5)_2$ and phenyldimethoxysilane $(C_6H_5)Si(OCH_3)_2$ and various combinations thereof in any ratios, provided that either $R'''$ or $R^o$ group in the dialkoxy silane is hydrogen.

According to variations of the present disclosure, the siloxane sol-gel is preferably prepared by reacting the alkoxy silanes in the presence of the porous carbon-containing fabric substrate in an alcohol medium containing some water (for example, up to about 10% by weight of the alcohol). The weight ratio between the dialkoxy silane and the trialkoxy silane ranges from about 1.0 part by weight of the dialkoxy to 1.0 to 20 parts by weight of the trialkoxy silane, and preferably from about 1.0 to 10 parts by weight of the trialkoxy silane. Where a tetralkoxy silane is used, then up to about 50% by weight of the trialkoxy silane can be replaced with the tetralkoxy silane. The alcohol is thought to insure that a substantially homogeneous sol-gel is obtained. While ethanol is preferred, other lower alcohols, such as, for example, methanol, ethanol, propanol, isopropanol, butanol, sec- and isobutanol, pentanol, may be used alone or in any admixture.

Although the sol may be gelled by aging at ambient temperatures, or by heating, according to one alternative it is preferred to catalyze gellation by adding a mineral acid, such as, for example, $HNO_3$, HCl, etc., or a base such as, for example, NaOH, KOH, ammonium hydroxide, etc., to the reaction mixture. Nitric acid and ammonium hydroxide are particularly useful gellation agents. Gellation will ordinarily occur at ambient conditions, but heating to temperatures of from about 40°-90° C. is preferred according to variants of the present disclosure, in addition to the use of an acid or base catalyst.

The lightweight, pliable ceramic high temperature-resistant ceramic fabrics according to variations of the present disclosure can be formed by using a lightweight porous carbon-containing fabric as the substrate. The fabric is preferably impregnated with the sol before the sol gels to coat the carbon-containing fabric. After gelation, the impregnated fabric is removed from the gel, surplus gel removed and the impregnated preform is dried in an oven or at ambient conditions to form the ceramic precursor. Vacuum drying is then preferably applied, for example, overnight at from about 70° to about 100° C. to insure that all volatiles are removed prior to the inert atmosphere pyrolysis.

More preferably, according to the present disclosure, the pliable ceramic fabric gap fillers are formed by heating the coated substrate at temperatures in the range of from about 800° to about 1500° C. During the high-temperature, inert atmosphere pyrolysis, the carbon supplied to or contained within the fabric enters into the pyrolysis reaction with the dried gel and forms part of the ceramic. The inert atmosphere includes an atmosphere of one or more of the inert gases, such as, for example, argon, etc.

While one coating step may be sufficient to achieve an end product (pliable ceramic gap filler) having desired properties, multiple impregnations or coating steps of the ceramic fabric are also contemplated to achieve the desired weight of the finished pliable ceramic gap filler, with drying and inert gas pyrolysis steps following each coating step. The weight ratio between the fabric substrate and the gel coating is about one part by weight of the substrate fabric to 2-10 parts by weight of the siloxane gel.

It is understood that various ceramic-containing fabric may be used as the starting substrate to be coated by the siloxane gel. Preferred substrates include alumina fabric, carbon fabric, silicon carbide fabric, etc. According to the present disclosure, particularly preferred combinations include: 1) alumina fabric coated with a mixture of zirconia refractory coating and an emittance agent; 2) aluminia fabric coated with a mixture of colloidal alumina, alumina powder and an emittance agent; 3) silicon carbide fabric coated with colloidal silica; 4) silicon carbide fabric coated with an unpyrolyzed silicon carbide pre-ceramic polymer coating; and 5) a carbon fabric infiltrated with a siloxane gel to achieve a non-oxide silicon-oxy-carbide (SILOXY) fabric subsequently coated with a de-ionized Ludox to protect against oxidation.

The end product gap fillers of the present disclosure display superior high-temperature capability as compared to presently known $SiO_2$ based alternatives. Importantly, the gap fillers of the present disclosure maintain their pliability, even after exposure to extreme heat of up to about 2800° F., and therefore do not suffer structural degradation in terms of becoming weak or brittle. According to alternatives of the present invention, the presently disclosed gap filler may rely on the emissivity of the fabric itself (rather than a coating), such that, in the event of damage to a gap filler, there will be virtually no loss in emissivity as opposed to an emissivity agent supplied to the fabric in a coating. In other alternatives, an emissivity agent is incorporated.

The following examples illustrate the preparation of the improved pliable ceramic gap filler insulations according to the present disclosure.

Example 1

A gap filler was made by mixing 231 grams of ZRCl Alumina Coat, 45 gram of High-Purity Alumina Powder, AKP-50 and 24 grams of Ferro 10335 Black to create a coating that was applied by brush to a 3 ft×1 ft piece of heat cleaned Nextel 720 fabric. The coating was applied first to a first side and allowed to dry 4 hours, and then the coating was applied to the opposite, second side and allowed to dry. This process was repeated and an ultimate weight gain of 0.28 g/sq. inch was achieved. The coated fabric was allowed to dry for 16 hours and then 5"×10" samples were cut from the coated fabric. These samples were tested is a radiant test chamber where they were exposed to temperatures greater than 2875° F. in approximately 3 Torr of air. The test samples maintained a greater emissivity and structural integrity than known state-of-the-art $SiO_2$ based gap fillers.

Example 2

A gap filler was made by first heat cleaning Tyranno SA fabric cut into a 16"×24.5" sheet at 1200° F. for 2 hours. The fabric was then coated on a first side with De-ionized Ludox AS-30 and allowed to dry for 4 hours, before coating on the second side. The weight gain of the fabric was 0.36 g/sq. inch. The coated fabric was allowed to dry for 16 hours and then cut into 5"×10" samples. These samples were tested in a radiant test chamber where they were exposed to temperatures greater than 2875° F. in approximately 3 Torr of air. The test samples maintained a greater emissivity and structural integrity than known state-of-the-art $SiO_2$ based gap fillers.

Example 3

A gap filler based was made by heat cleaning a 15"×12" piece of Tyranno SA silicon carbide fabric at 1000 F for 1.5 hours. Next, 100 g of KDT Ceraset Polysilazane 20 was mixed with 33 g of beta-SiC powder. This mixture was then impregnated into the silicon carbide fabric, resulting in a weight gain of 0.47 g/sq. inch. The impregnated silicon carbide fabric was then vacuum bagged and cured in a heated press up to 350° F. and 100 psi for 1 hour. The cured fabric was then further dried in an oven at 250° F. for 30 minutes. After drying, 5"×10" samples were cut from the sheets. The samples were tested in a radiant test chamber where they were exposed to temperatures greater than 2875° F. in approximately 3 Torr of air. The test samples maintained a greater emissivity and structural integrity than known state-of-the-art $SiO_2$ based gap fillers.

Example 4

A gap filler was made by first heat cleaning a carbon fabric under flowing nitrogen cover gas at 750° F. for 2 hours. The heat cleansed fabric was then cut into 8.5"×10" sheets. Next, 800 g of Trimethoxymethylsilane 246174 (Sigma Aldrich, St. Louis, Mo.) was mixed with 160 g of Methyldiethoxysilane SIM6506.0-Y01 (Gelest, Marrisville, Pa.) and 200 g of 0.8 molar ammonium hydroxide. The infiltrated fabric was allowed to gel overnight at 88° F. and then the excess gel manually removed from the fabric. The impregnated fabric was then dried for 8 hours at 200° F. under 30 in Hg of vacuum. The fabric was then pyrolyzed in a flowing argon atmosphere for 30 minutes at 2012° F. This process was repeated suing the same quantities of chemicals at the same temperatures/times/vacuum levels. The sheets then had De-ionized Ludox AS-30 applied to both sides of the fabric to achieve a weight gain of 0.19 g/sq. inch. The coated fabric was then further dried in an oven at 200 F for 2 hours. After drying, 5"×10" samples were cut from the sheets. These samples were tested in a radiant test chamber where they were exposed to temperatures greater than 2875° F. in approximately 3 Torr of air. The test samples maintained a greater emissivity and structural integrity than known state-of-the-art $SiO_2$ based gap fillers.

The present disclosures find utility as high temperature-resistant, resusable gap fillers, seals and other parts positioned in the interior and exterior of vehicles and objects that are subjected to re-entry temperatures up to and in excess of about 2800° F. The vehicles and objects include without limitation, manned and unmanned, terrestrial and non-terrestrial objects and vehicles, including spacecraft.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof.

We claim:

1. A method for creating a pliable thermal insulating material comprising the steps of:
   providing a high-temperature fabric having first and second sides;
   providing an oxidation-resistant coating;
   coating the first and second sides of the high-temperature fabric with the oxidation-resistant coating to obtain a coated fabric; and
   drying the coated fabric,
   wherein the thermal insulating material is reusable after exposure to temperatures of up to about 2800° F.

2. The method of claim 1, wherein, when the fabric is an oxide-based fabric, said fabric comprises alumina and the coating comprising a zirconia refractory coating, de-ionized water and a compatible emittance agent.

3. The method of claim 1, wherein, when the fabric is an oxide-based fabric, said fabric comprises alumina and the coating comprises colloidal alumina, alumina powder and a compatible emittance agent.

4. The method of claim 1, wherein, when the fabric is a non-oxide-based fabric, said fabric comprises silicon carbide and the coating comprises colloidal silica.

5. The method of claim 1, wherein, when the fabric comprises a non-oxide based fabric, said fabric comprises silicon carbide and the coating comprises an unpyrolyzed silicon carbide pre-ceramic polymer resin and silicon carbide powder.

6. The method of claim 1, wherein, when the fabric comprises a non-oxide based fabric, said fabric comprises a carbon-containing material and the coating comprises silicone.

7. The method of claim 1, wherein the coating comprises di- and trifunctional alkoxide reactants having the general formula:
   $(R'O)_3$—Si—R and $(R'''—O)_2$—Si—$R'''R°$, wherein R, R', R", R''' and R° are the same or different and represent hydrocarbon radicals of 1-12 carbons; provided that either R''' or R° is a hydrogen atom, R' and R" are alkyl radicals, and R, R''' or R° is an alkyl, aryl, or substituted aryl radicals of 1-12 carbons.

8. The method of claim 7, wherein hydrocarbon radicals are radicals comprising carbon and hydrogen and that are selected from the group consisting of: straight chain radicals; branched chain radicals; saturated radicals; unsaturated radicals; and combinations thereof.

9. The method of claim 7, wherein the hydrocarbon radicals comprise groups having from 1-12 carbon atoms, and wherein at least one of the hydrocarbon groups contain at least two carbon atoms, and either R''' or R° is hydrogen.

10. The method of claim 7, wherein the coating is a silane-containing composition comprising materials selected from the group consisting of alkyl-trioxy silanes; alkyldialkoxy silanes; and combinations thereof, provided that either R''' or R° group in the dialkoxy silane is hydrogen.

11. The method of claim 10, wherein the silane-containing composition is selected from the group consisting of: methyltrimethoxysilane $CH_3Si(OCH_3)_3$, ethylythimethoxysilane $CH_2H_5Si(OCH_3)_3$, methyltriethoxysilane $CH_3Si(OC_2H_5)_3$, methyldiethoxysilane $(CH_3)Si(OC_2H_5)_2$, methyldimethoxysilane $(CH_3)Si(OCH_3)_2$, ethyldiethoxysilane $(C_2H_5)Si(OC_2H_5)_2$, ethyldibutoxysilane $(C_2H_5)Si(OC_4H_9)_2$, vinyldiethoxysilane $(CH_2{:}CH)Si(OC_2H_5)_2$, phenyldimethoxysilane $(C_6H_5)Si(OCH_3)_2$, and combinations thereof in any ratios, provided that either R''' or R° group in the dialkoxy silane is hydrogen.

12. A method for making a thermal insulating material comprising the steps of:
   providing a non-oxide-containing base fabric comprising a carbon-containing material, said base material having first and second sides;
   providing a silicon-containing gel coating;
   infiltrating the base fabric with the silicon-containing gel coating;
   drying the coated base fabric; and
   pyrolyzing the coated base fabric in an inert environment and converting carbon-containing material into a reusable silicon-oxy-carbon-containing material;
   wherein the thermal insulating material is reusable after exposure to temperatures of up to about 2800° F.

13. The method of claim 12, further comprising the step of:
   coating the pyrolyzed base fabric with a low alkali-based coating comprising colloidal zirconia, colloidal silica, and colloidal alumina.

* * * * *